United States Patent Office 3,597,468
Patented Aug. 3, 1971

3,597,468
COLORED AMINE REACTED POLYMERS
Gregorie Kalopissis and Andre Viout, Paris, France, assignors to L'Oreal, Paris, France
No Drawing. Filed Sept. 2, 1966, Ser. No. 576,811
Claims priority, application Luxembourg, Sept. 6, 1965, 49,441; Jan. 10, 1966, 50,228; June 14, 1966, 51,325; June 16, 1966, 51,345
Int. Cl. C07c 107/06, 121/66
U.S. Cl. 260—465D
2 Claims

ABSTRACT OF THE DISCLOSURE

Hair coloring polymers having anhydride or acid halide groups, which have reacted with dyes having extra nuclear amine and/or hydroxyl groups.

---

Natural resins in alcoholic or hydro-alcoholic solutions are conventional ingredients in hair lacquers and hair setting lotions. Most of the lacquers or setting lotions presently in use are transparent and are used to hold the hair in place and impart various characteristics thereto without trying to change the color of the hair.

It has, however, already been suggested that hair lacquers or setting lotions be used to color the hair.

Attempts have accordingly been made to introduce soluble dyes into solutions of the resins used to prepare the lacquers or lotions, but the results have not been satisfactory because the dye is not retained by the resin and hair treated with such products tends to stain the skin, the hands of those who use the product, and clothing coming in contact therewith.

In order to mitigate this difficulty, it has been suggested that hair lacquers or setting lotions be made from colored polymers obtained by copolymerization of a colored monomer and a colorless monomer or by chemically combining a resin with a dye capable of durably coloring that resin.

In particular, it has already been suggested by one of the applicants that colored polymers be made comprising amide groups, the nitrogenized portion of which comprises aromatic diamine dyes.

However, these colored polymers have not proven entirely satisfactory for use in making hair lacquers and setting lotions because of certain inherent disadvantages.

In the first place, the bonding of the dye to the resin or the monomer which is a constituent of the resin weakens or undesirably alters the shade of the dye.

Even more importantly, the various colored resins heretofore proposed have inadequate cosmetic qualities as compared with those of the colorless resins presently in use.

It is known that resins to be used in hair lacquers and setting lotions must have certain contradictory qualities which are difficult to reconcile.

In the first place, the resins used must be soluble in an alcoholic or hydroalcoholic medium, so that they may be applied and easily removed by shampooing. On the other hand, they must have an excellent resistance to humidity so that they do not impart an unattractive sticky appearance to the hair.

Moreover, the resins must be highly transparent and durable, so as to impart lustre to the hair. They must also be easily removed by simple brushing of the hair, without having any tendency to scale off or crumble when the hair is subjected to the bending and twisting normal in day-to-day living.

It is also well known to condense alcohols on polymers obtained by copolymerizing maleic anhydride and an unsaturated monomer in order to produce colorless hair lacquers.

It is furthermore known that dyes may be condensed on such polymers in order to produce colored pigments which are particularly useful in the field of color photography.

However, it should be noted that it is impossible to obtain colored polymers suitable for cosmetic use by mixing such colorless resins and those colored polymers which have been developed for use in photography, because a mixture of such polymers is not soluble in the alcoholic or hydroalcoholic solutions which are used in cosmetology, even when the percentage of colored polymers is relatively small.

The present invention relates to colored resins having characteristics which permit their use in hair lacquers and hair setting lotions. Their cosmetic properties are comparable to those of the better colorless lacquers presently on the market and the dye is combined without having any adverse effect on the qualities of the supporting resin.

For convenience, the new colored resins of this invention may be divided into three general types.

In the first type, the colored resin is essentially characterized by the fact that it is a copolymer resulting from the simultaneous condensation of at least one alcohol and either at least one hydroxyl dye or at least one amine dye or a mixture of these two types of dye on a polymer obtained by copolymerizing equimolecular quantities of maleic anhydride and an unsaturated monomer.

In the second type, the colored resin is essentially characterized by the fact that its macromolecular chain consists of monomeric units to which an extra-nuclear amine dye is attached by a chemical bond of the amide type, said bond being formed by the nitrogen of the extra-nuclear amine function.

In the third type, the colored resin is a chemically bonded dyed homopolymer characterized by the fact that its macromolecular chain consists of a homopolymer to which at least one amine dye is attached by a chemical bond of the amide type. The term "dyed homopolymer" is, however, when defining this third type of resin, used to include resins having dyes attached at certain points along their chains and other groups, e.g., alcohols, attached at other points, so that all the monomeric units of the dyed homopolymer are not necessarily identical. The quoted terminology thus means only that the dyed resin is obtained by starting with a homopolymer.

Turning now to colored resins of the first type, these may be prepared by condensing alcohol and one or more dyes on a copolymer having the following formula:

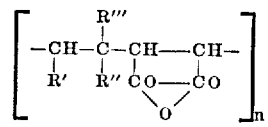

I in which:
R' and R" represent a hydrogen atom, a lower alkyl radical, a phenyl radical or a lower alkoxy radical, and R' and R" may be different or identical;
R''' represents a hydrogen atom, the —OCOCH$_3$ radical, the —C≡N radical, or the —COOCH$_3$ radical; and
$n$ is a whole number within the water soluble polymer range.

Among the copolymers responding to the above Formula I which may be used to obtain colored polymers in accordance with the invention are: maleic anhydride/vinylalkyl ethers, maleic anhydride/ethylene, maleic anhydride/vinyl acetate, maleic anhydride/alkyl acrylate or methacrylate, and maleic anhydride/acrylonitrile, but this list is not exhaustive.

The colored polymers of this invention preferably respond to the following general formula:

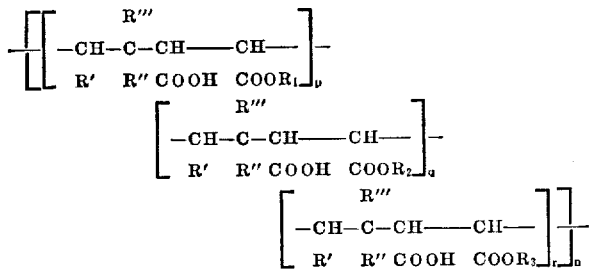

in which:

R', R'', R''' and $n$ have the same significance as indicated in connection with Formula I;

$R_1$ represents a lower alkyl such as $-CH_3$, $-C_2H_5$, $C_4H_9$;

$R_2$ represents the remaining portion of a dye having a hydroxyl radical, and $R_3$ represents the remaining portion of a dye having a primary or secondary amino radical, which may be nuclear or extra-nuclear, and $p$, $q$ and $r$ represent whole numbers. Either $q$ or $r$ may be equal to zero, but both may not equal zero simultaneously.

Among the dyes having a hydroxyl or a primary or secondary amino radical which may be used are, for example, the azo, anthraquinone, azinic, and amino-triphenylmethane dyes, as well as those dyes derived from nitrophenylenediamines.

The use of these dyes makes it possible to obtain shades in any part of the spectrum, for example, blues, violets, reds, browns, or yellows.

In order to obtain a desired shade several colored polymers produced according to the invention may be mixed together.

It is also possible to produce a polymer having the desired shade by condensing a suitable mixture of various dyes on the colorless copolymer.

The properties of the colored polymers obtained in accordance with the invention depend in part on the alcohol which is condensed on the colorless copolymer and in part on the proportion between the dyes and alcohol which is condensed on the copolymer.

The colored copolymers of this invention generally contain 80 to 95% alcohol in proportion to the anhydride radicals of the starting polymer and 5-20% of dyes in proportion to the anhydride radicals of the starting polymer.

When the semi-esters or the mixed semi-amide semi-esters which constitute the colored copolymers which have just been described are neutralized with mineral or organic bases, they become endowed with good solubility in alcohol or hydroalcoholic mixtures and this is indispensable if they are to be used as cosmetic resins in the form of aerosols or in solutions.

The colored copolymers according to the invention may be prepared by condensing the alcohol and the dye or dyes on the colorless copolymer, using heat and a solvent such as dioxane or the ketones.

The order in which the condensation of the various components on the copolymer is carried out is quite variable.

For example, the dye may be condensed first, and then the alcohol, but it is also possible to first condense part of the alcohol, then the dye, and finally the rest of the alcohol. It is also possible to condense the alcohol and dye simultaneously on the colorless copolymer. The colored copolymer is then isolated by precipitation and its characteristics determined by measurement of its amide-ester or amide radicals.

It has been noted that the condensation of the dye on the copolymer according to the invention in no way changes the cosmetic properties from those of colorless copolymers obtained by condensation of the same alcohol on the same starting copolymer, in the absence of any dye.

This result is surprising because the colored copolymers obtained by condensing only a dye of the same type lead to insoluble colored resins which, even when introduced in small quantities, if mixed with colorless resins obtained by condensation of alcohol alone, render the latter unsuitable for any cosmetic use.

Another object of the invention is to provide hair lacquers or setting lotions essentially characterized by the fact that they contain at least one colored copolymer of the type hereinbefore described, in an alcoholic or hydroalcoholic solution.

In order to produce aerosol hair lacquers according to the invention, a 2-20% solution in alcohol of the colored copolymer hereinbefore described, or of a mixture of that copolymer and some other cosmetic resin, is first prepared. To this solution is added two to three times its own weight of a propellant which has been liquefied under pressure, such as one or more of the halogenated hydrocarbons sold under the trademark "Freon."

A hair setting lotion in accordance with the invention may be produced by mixing a 20°–50° alcoholic solution with from about 0.5% to 6% by weight of a colored copolymer according to the invention or mixture of such colored copolymers with other colorless copolymers.

In accordance with the invention the colored copolymers hereinbefore described may also, in order to produce hair lacquers or setting lotions, be mixed with other colorless polymers such as polyvinylpyrrolidone, or copolymers such as polyvinylpyrrolidone/vinyl acetate, vinyl acetate/unsaturated carboxylic acid, and semi-esters of copolymers of maleic anhydride and vinyl alkyl ethers, in proportions dependent on the intensity of the coloring effect sought.

The hair lacquers and setting lotions for the hair in accordance with the invention may also contain any other substances generally used in cosmetology, such, for example as plasticizers or perfumes.

The hair lacquers or setting lotions made from the colored copolymers according to the invention have the same cosmetic properties as hair lacquers and setting lotions made from colorless resins having the same composition, except for the dye.

The fact that the resins are colored enables them to impart a certain shade to the hair without any resulting deterioration of the other qualities of the cosmetic product.

Tests carried out by applicant have shown that the colored copolymers according to the invention do not stain the skin, or any part of the clothing which may come in contact therewith after it has been applied to the hair.

Moreover, they can be quickly and completely removed by washing or brushing, so that a desired tint can be easily imparted to the hair for a time which may be as short as desired.

In order that the invention may be better understood, several examples of the preparation and application of the type I copolymers will now be described, purely by way of example.

EXAMPLE 1

Preparation of a colored mixed semi-ester copolymer by condensing n-butyl alcohol and a dye having the formula:

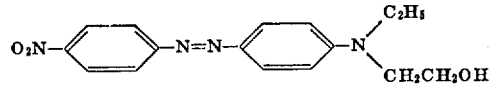

on a methylvinyl ether-maleic anhydride copolymer.

150 ml. of methylisobutylketone, 6.3 grams (0.02 mol) of the above dye, 13.3 grams (0.18 mol) of n-butanol, and 30 grams (0.2 mol) of the methylvinyl ether/maleic anhydride copolymer are introduced into a flask provided with an agitator, a thermometer and a reflux condenser.

Measurement of the anhydride function of this copolymer indicates that the molar ratio between the methylvinyl ether and maleic anhydride is 0.9/1.

Reflux is maintained for 16 hours. Esterification is completed by adding 15 grams (0.2 mol) of n-butanol and again heating to reflux for 8 hours.

At the end of the reaction the colored copolymer is precipitated with ether and any unreacted dye is extracted.

After drying, the result is a yield of 79% by weight of a red powder which, after neutralization, is soluble in alcohol and in a mixture of water and alcohol.

Analysis indicates that 35% of the theoretically possible quantity of dye is combined.

EXAMPLE 2

Preparation of a colored mixed semi-ester copolymer by condensing on a methylvinyl ether/maleic anhydride copolymer both n-butyl alcohol and a dye having the formula:

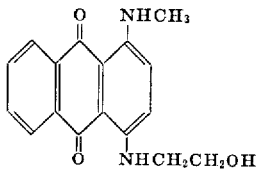

150 ml. of methylisobutylketone, 13.3 grams (0.18 mol) of n-butanol and 30 grams (0.2 mol) of the methylvinyl ether/maleic anhydride copolymer is introduced into a flask provided with an agitator, a thermometer and a reflux condenser, and brought to reflux for 12 hours.

6 grams (0.02 mol) of the above dye are then added and reflux maintained for 8 hours. Esterification is completed by adding 15 grams (0.2 mol) of n-butanol and again heating to reflux for eight hours.

At the end of the reaction the colored copolymer is precipitated with ether and the unreacted dye is extracted.

After drying, the yield is 91% by weight of a blue powder which, after neutralization, is soluble in alcohol and in a mixture of water and alcohol.

Analysis shows that the 23% of the theoretically possible quantity of dye is combined.

EXAMPLE 3

Preparation of a colored mixed semi-ester copolymer by condensing on a vinyl methyl ether/maleic anhydride copolymer both n-butyl alcohol and a dye having the formula:

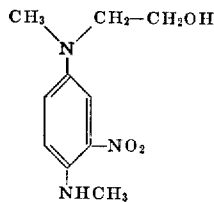

150 ml. of methylisobutylketone, 13.3 grams (0.18 mol) of n-butanol, 4.5 grams (0.02 mol) of the above dye and 30 grams (0.2 mol) of the vinyl methyl ether/maleic anhydride copolymer is introduced into a flask equipped with an agitator, a thermometer and a condenser.

This is brought to reflux for 16 hours. Esterification is completed by adding 15 grams (0.2 mol) of n-butanol and heating to reflux for 8 hours.

At the end of the reaction the colored copolymer is precipitated with ether and the uncombined dye extracted.

After drying, the result is a yield of 85% by weight of a violet powder which, after neutralization, is soluble in water and in a mixture of water and alcohol.

Analysis shows that 40% of the theoretically possible quantity of dye is combined.

EXAMPLE 4

Preparation of a colored mixed semi-ester copolymer by condensing on a methylvinyl ether/maleic anhydride copolymer both n-butyl alcohol and a dye having the formula:

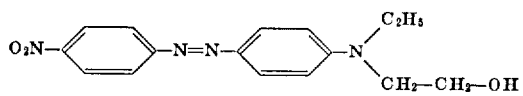

The method is the same as that described in Example 1, except that twice as much dye is used, i.e., 0.04 mol instead of 0.02 mol for each 0.2 mol of colorless copolymer.

After precipitation, extraction, and drying, the result is a yield of 68% by weight of a red powder which, after neutralization, is soluble in alcohol and in a mixture of water and alcohol.

Analysis shows that 29% of the theoretically possible quantity of dye is combined.

EXAMPLE 5

Preparation of a colored mixed semi-amide semi-ester copolymer by condensing on a methyl vinyl ether/maleic anhydride copolymer both n-butyl alcohol and a dye having the formula:

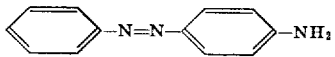

150 ml. of methylisobutylketone, 13.3 grams (0.18 mol) of n-butanol, 4 grams (0.02 mol) of the above dye and 30 grams (0.2 mol) of the methylvinyl ether/maleic anhydride copolymer is placed in a flask equipped with an agitator, a thermometer, and a condenser.

This is heated to reflux for 16 hours. Esterification is completed by adding 15 grams (0.2 mol) of n-butanol, and again heating to reflux for eight hours.

At the end of the reaction the colored copolymer is precipitated with ether and the unreacted dye is extracted.

After drying, the result is a yield of 89% by weight of a yellow-orange powder which, after neutralization, is soluble in alcohol and in a mixture of water and alcohol.

Analysis indicates that 86% of the theoretically possible quantity of dye is combined.

EXAMPLE 6

Preparation of a colored mixed semi-amide-semi-ester by condensing on a methylvinyl ether/maleic anhydride copolymer both n-butyl alcohol and a dye having the formula:

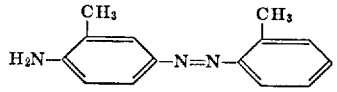

150 ml. of methylisobutylketone, 13.3 grams (0.18 mol) of n-butanol, 4.25 grams (0.02 mol) of the above dye, and 30 grams (0.2 mol) of the methylvinyl ether/maleic anhydride copolymer are introduced into a flask provided with an agitator, a thermometer and a reflux condenser.

This mixture is brought to reflux for 16 hours. Esterification is completed by adding 15 grams (0.2 mol) of n-butanol and then heating for eight hours. When the reaction is terminated the colored copolymer is precipitated and the unreacted dye is extracted.

After drying, the result is a yield of 88% by weight of a yellow-orange powder which, after neutralization, is soluble in alcohol and in a mixture of water and alcohol.

Analysis indicates that 82% of the theoretically possible quantity of dye has been combined.

EXAMPLE 7

Preparation of a colored mixed semi-amide semi-ester copolymer by condensing on a methylvinyl ether/maleic anhydride copolymer both n-butyl alcohol and a dye having the formula:

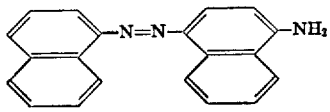

100 ml. of methylisobutylketone, 6.65 grams (0.09 mol) of n-butanol, 3 grams (0.01 mol) of the above dye, and 15 grams (0.1 mol) of the methylvinylether/maleic anhydride copolymer are introduced into a flask provided with an agitator, a thermometer, and a reflux condenser.

The mixture is brought to reflux for 20 hours. Esterification is completed by adding 7.5 grams (0.1 mol) of n-butanol and then heating again for 8 hours.

When the reaction has been completed the colored copolymer is precipitated with ether and the unreacted dye is extracted.

After drying, the result is a yield of 87% by weight of a brown powder which, after neutralization, is soluble in alcohol and in a mixture of water and alcohol.

Analysis indicates that 77% of the theoretically possible quantity of dye has been combined.

EXAMPLE A

In order to prepare a colored aerosol lacquer according to the invention, the following solution is first prepared:

|  | G. |
|---|---|
| Copolymer obtained as set forth in Example 2 | 1 |
| Vinyl acetate/crotonic acid copolymer | 7 |
| 2-amino-2-methyl propanol | 1.28 |
| Ethyl alcohol | 100 |

25 grams of this solution are mixed in an aerosol bomb with 47 grams of trichloromonofluoromethane sold under the trademark "Freon 11" and 28 grams of dichlorodifluoromethane sold under the trademark "Freon 12."

When this is sprayed on dark hair the result is a midnight blue shade, which can be eliminated by brushing but does not rub off on pillows or clothing.

EXAMPLE B

In order to make a setting lotion in accordance with the invention, the following solution is first prepared:

| Copolymer obtained as set forth in Example 1 | g | 2 |
| --- | --- | --- |
| 2-amino-2-methyl propanol | g | 0.72 |
| Ethyl alcohol | ml | 50 |
| Water | ml | 100 |

This solution is applied to moist auburn hair, after shampooing. The hands of the individual applying the solution remain completely unstained.

After conventional setting and drying the result is a very bright copper shade, which does not rub off on white linen.

Turning now to colored resins of the second type listed in the prefatory portion of this specification, colored resins of this second type have all the advantages possessed by those of the first type, and have in addition the advantage that they may be obtained in a high degree of purity, without being mixed with residual amounts of uncombined dye, which are free to come off on and stain the clothing and skin of the user. This is because the colored resins of the second type can be washed to eliminate the uncombined dye.

The colored resins of the second type have the further advantage that the dyes are attached to the polymers by a solid chemical bond which has no adverse effect on the cosmetic qualities of the polymer.

As was pointed out in the prefatory portion of the specification, colored resins of the second type are characterized by the fact that the macromolecular chain thereof comprises monomeric units to which an extra-nuclear amine dye is attached by a chemical bond of the amide type, said bond being formed by the nitrogen of the extra-nuclear amine function.

The said monomeric units may be of any of the following types:

Acid anhydrides having the formula:

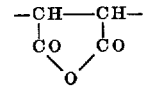

Acid halides and particularly acid chlorides having the formula:

Esters having the formula:

in which R represents an alkyl group comprising from 1 to 4 carbon atoms.

In the above cited examples of monomeric units it goes without saying that the carbon atoms making up part of the macromolecular chain may be substituted if so desired.

Among the polymers which may be used as cosmetics and which monomeric units on the basis of which colored polymers according to the invention may be formed are:

Polymers having the following formula:

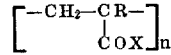

in which:

R represents hydrogen or a methyl radical,

X represents a halogen such as chlorine, and $n$ is an integer such that the molecular weight is between about 1,000 and about 10,000.

Among the polymers responding to the above formula one of the most useful is polyacrylyl chloride which may easily be obtained by polymerization of an acrylyl chloride in the presence of $\alpha$-$\alpha'$-azo-bis-iso-butyronitrile, which acts as a catalyst. Other suitable polymers are:

The polymers used to prepare the colored resins of the first type described in this specification, i.e., the polymers obtained by copolymerization of equimolecular quantities of maleic anhydride and an unsaturated monomer such as those having the following formula:

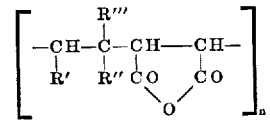

in which:

R' and R'' represent a hydrogen atom, a lower alkyl radical, a phenyl radical or a lower alkoxy radical, with R' and R'' being the same or different, R''' represents either a hydrogen atom, the —OCOCH$_3$ radical, the —C≡N radical, or the —COOCH$_3$ radical, and $n$ is an integer within the water soluble polymer range.

The polymers obtained by copolymerization of maleic anhydride and an unsaturated monomer which have undergone esterification, in particular those responding to the following formula:

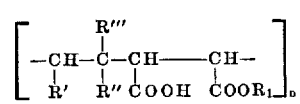

in which:

R', R'', R''' and $n$ have the above-indicated meanings,

R$_1$ represents a lower alkyl radical such as —CH$_3$, —C$_2$H$_5$ or —C$_4$H$_9$.

The colored polymers of this second type may be obtained by reacting the extra-nuclear amine dyes on only some of the reacting monomeric units of the polymer, particularly in the case in which the polymers consist entirely of monomeric units which can form bonds of the amide type with extra-nuclear amine dyes.

However, it is also possible to make colored polymers from polymers which have only a certain percentage of monomeric units which are capable of forming an amide bond with the extranuclear amine dye, in which case it is clearly possible to make the dyes react on all the monomeric units which have this capability.

In other words, the colored polymers of this invention may be made wholly of monomeric units to which extra-nuclear amino dyes may be attached by an amide bond, in which case the proportions of dye and polymer which are reacted are chosen in view of the intensity of coloration desired; but they may also consist of macromolecular chains having only a certain percentage of monomeric units which can form an amide bond with the dye.

Among the extra-nuclear amino dyes which may be used are those responding to the following formula:

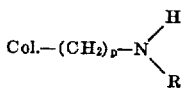

in which:

$p$ is a number between 2 and 6,

R represents either a hydrogen atom, the —$CH_3$ radical, or the —$C_2H_5$ radical.

The expression Col. represents a cyclic or polycyclic dye such for example, as a benzenic or anthraquinone dye.

Among the dyes defined above, those having one or two supplementary amine functions attached directly to their ring may be particularly used conforming to the invention.

Conforming to the invention it is possible to attach to a single polymer several extra-nuclear amino dyes so as to obtain the desired shade.

The preparation of the colored polymers of this invention may be easily carried out by condensing the dye or dyes on the original polymers in the presence of an appropriate solvent which is inert with respect to the dyes.

The polymers according to the invention may also be prepared by condensing the dye on monomers having reacting groups which can form an amide bond with the extra-nuclear amino dyes and then proceeding to a polymerization or a copolymerization.

If it is desired to prepare colored copolymers of this invention from a polymer resulting from the copolymerization of maleic anhydride and an unsaturated monomer, in which the colored resin comprises monomeric units which have been colored by bonding thereto extra-nuclear amino dyes in accordance with the invention, as well as other monomeric units which have been esterified to produce desired cosmetic properties in the resin, it is possible to proceed along two distinct lines.

First, if desired, a mixture of alcohol and extra-nuclear amino dye may be made to react conjointly on the maleic anhydride/unsaturated monomer copolymer in proportions chosen in view of the desired result.

It is also possible to proceed differently, and to first produce a total semi-esterification of the maleic anhydride/unsaturated monomer copolymer, and then cause the extra-nuclear amino dyes according to the invention to react on certain monomeric units of this semi-ester polymer.

Several examples disclosing specific colored resins of this second type will now be described together with suitable methods for preparing them. These examples are, of course, given purely by way of illustration, and many others falling within the scope of the foregoing description can be prepared in like manner.

EXAMPLE 8

Preparation of a mixed semi-ester semi-amide colored copolymer by condensing on a methylvinylether/butyl monomaleate copolymer, known under the trademark "Gantrez AN 3953," a dye having the formula:

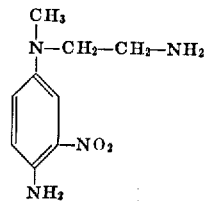

87 g. (0.2 mol) of an alcoholic solution containing 53.5% of the resin sold under the trademark "Gantrez AN 3953" is placed in a flask furnished with agitating means, a thermometer and a reflux condenser and diluted with 60 g. of ethanol. 2.1 g. (0.01 mol) of dye is added and it is heated to reflux for 10 hours. After this time, an alcoholic solution is obtained containing 31% of a red resin.

It is seen from analyses that the quantity of the dye bonded to the polymer by amidification is 95% of that theoretically possible.

By dilution, this solution may be used directly to prepare lacquers or hair-setting lotions.

EXAMPLE 9

Preparation of a mixed semi-ester semi-amide colored copolymer by condensing on a methylvinylether/butyl monomaleate copolymer, known under the trademark "Gantrez AN 3953," a dye having the formula:

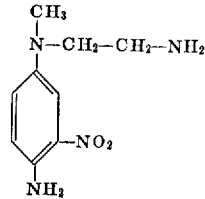

The procedure is the same as that described in Example 8, except that four times more dye is reacted, that is 0.04 mol of dye is used instead of 0.01 mol for each 0.2 mol of colorless copolymer.

Analysis shows that the quantity of dye bonded to the polymer by amidification is 90% of that theoretically possible.

This solution may also be used directly to prepare lacquers and setting lotions.

EXAMPLE 10

Preparation of a mixed semi-ester semi-amide colored copolymer by condensing on a methylvinylether/butyl monomaleate copolymer known under the trademark "Gantrez AN 3953," a dye having the formula:

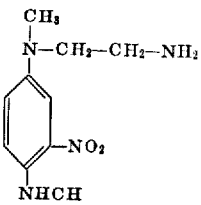

87 g. (0.2 mol) of an alcoholic solution containing 53.5% of the resin sold under the trademark "Gantrez AN 3953" are placed in a flask equipped with agitating means, a thermometer and a reflux condenser, and diluted with 90 g. of ethanol.

4.5 g. (0.02 mol) of the dye having the above formula is added and it is heated to reflux for 9 hours.

After this time, an alcoholic solution containing 27% of a violine-colored resin is obtained.

Analysis shows that the quantity of dye bonded to the polymer by amidification is 86% of that theoretically possible.

EXAMPLE 11

Preparation of a mixed semi-ester semi-amide colored copolymer by condensing on a methylvinylether/butyl monomaleate copolymer known under the trademark "Gantrez AN 3953," a dye having the formula:

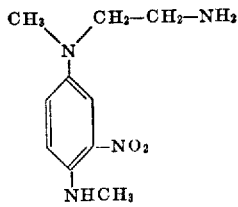

The procedure is the same as that described in Example 10, with the exception that twice as much dye is reacted (that is, 0.04 mol of dye for each 0.2 mol of colorless resin).

Analysis shows that the quantity of dye bonded to the polymer by amidification is 88% of that theoretically possible.

EXAMPLE 12

Preparation of a mixed semi-ester semi-amide colored copolymer by condensing on a methylvinylether/butyl monomaleate copolymer known under the trademark "Gantrez AN 3953," a dye having the formula:

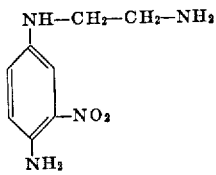

91.5 g. (0.2 mol) of an alcoholic solution containing 50% of the resin sold under the trademark "Gantrez AN 3953" are placed in a flask equipped with agitating means, a thermometer and a reflux condenser, and diluted with 71 g. of ethanol. 3.9 g. (0.02 mol) of dye are added and the mixture heated to reflux for 8 hours.

An alcoholic solution containing 30% raspberry red resin is then obtained.

Analysis shows that the quantity of dye combined with the polymer by amidification is 89% of that theoretically possible.

EXAMPLE 13

Preparation of a mixed semi-ester semi-amide colored copolymer by condensing on a methylvinylether/butyl monomaleate copolymer known under the trademark "Gantrez AN 3953," a dye having the formula:

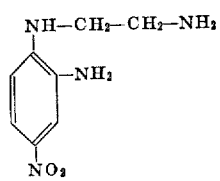

91.5 q. (0.2 mol) of an alcoholic solution containing 50% of the resin known under the trademark "Gantrez AN 3953" are placed in a flask equipped with agitating means, a reflux condenser and a thermometer and diluted with 150 g. of ethanol. 3.9 g. (0.02 mol) of dye having the above formula are added and the mixture is heated to reflux for 8½ hours.

An alcoholic solution containing 20% of a yellow-orange resin is obtained.

Analysis shows that the quantity of dye combined with the polymer by amidification is 87% of that theoretically possible.

EXAMPLE 14

Preparation of a mixed semi-ester semi-amide colored copolymer by condensing on a methylvinylether/butyl monomaleate copolymer known under the trademark "Gantrez AN 3953" a dye having the formula:

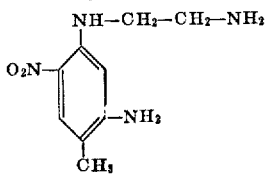

91.5 g. (0.2 mol) of an alcoholic solution containing 50% of the resin known under the trademark "Gantrez AN 3953" are put in a flask equipped with agitating means, a reflux condenser and a thermometer, and diluted with 155 g. of ethanol.

4.2 g. (0.02 mol) of the dye having the above formula are added and the mixture heated to reflux for 7½ hours. An alcoholic solution containing 20% of a lemon-yellow resin is obtained.

Analysis shows that the quantity of dye combined with the polymer by amidification is 84% of that theoretically possible.

This solution may be used directly to prepare lacquers or setting lotions.

If desired, the colored polymer may always be isolated in the form of a powder by precipitation from its solution and drying.

EXAMPLE 15

Preparation of a mixed semi-ester semi-amide colored copolymer by condensing on a methylvinylether/butyl monomaleate copolymer known under the trademark "Gantrez AN 3953," a dye having the formula:

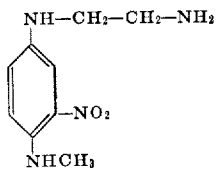

91.5 g. (0.2 mol) of a solution containing 50% of the resin known under the trademark "Gantrez AN 3953" are placed in a flask equipped with agitating means, a reflux condenser and a thermometer and diluted with 155 g. of alcohol. 4.2 g. (0.02 mol) of the above dye are added and it is heated to reflux for 8 hours. An alcoholic solution containing 20% of a violet-colored resin is obtained.

Analysis shows that the quantity of dye combined with the copolymer by amidification is 88% of that theoretically possible.

This solution may be used directly to prepare hair lacquers or setting lotions.

EXAMPLE 16

Preparation of a mixed semi-ester semi-amide colored copolymer by condensing on a methylvinylether/ethyl monomaleate copolymer known under the trademark "Gantrez AN 3152," a dye having the formula:

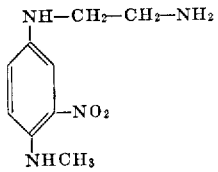

74.8 g. (0.2 mol) of an alcoholic solution containing 54% of the resin known under the trademark "Gantrez AN 3152" are placed in a flask equipped with agitating means, a reflux condenser and a thermometer, and diluted with 144 g. of ethanol.

4.2 g. (0.02 mol) of the dye having the above formula are added and it is heated to reflux for 16 hours. An alcoholic solution containing 20% of a violet-colored resin is obtained.

Analysis shows that the quantity of dye combined with the polymer by amidification is 85% of that theoretically possible.

This solution may be used directly to prepare lacquers or setting lotions.

EXAMPLE 17

Preparation of a mixed semi-ester semi-amide colored copolymer by condensing on a methylvinylether/butyl monomaleate copolymer known under the trademark "Gantrez AN 3953," a dye having the formula:

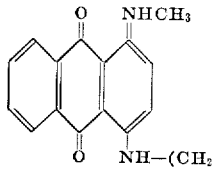

45.75 g. (0.1 mol) of an alcoholic solution containing 50% of the resin known under the trademark "Gantrez AN 3953" are placed in a flask equipped with agitating means, a reflux condenser and a thermometer and diluted with 82 g. of ethanol.

3.09 g. (0.01 mol) of the dye having the above formula are added and the mixture heated to reflux for 13 hours. An alcoholic solution containing 20% of a blue resin is obtained.

Analysis shows that the quantity of dye combined with the polymer by amidification is 88% of that theoretically possible.

This solution may be used directly to prepare lacquers or setting lotions.

EXAMPLE 18

Preparation of a mixed semi-ester semi-amide colored copolymer by condensing on a methylvinylether/butyl monomaleate copolymer known under the trademark, "Gantrez AN 3953," a dye having the formula:

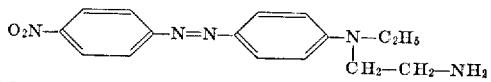

45.8 g. (0.1 mol) of an alcoholic solution containing 50% of the resin known under the trademark "Gantrez AN 3953" are placed in a flask equipped with agitating means, a reflux condenser and a thermometer, and diluted with 38 g. of ethanol.

3.1 g. (0.01 mol) of dye having the above formula are added and the mixture is heated to reflux for 12 hours. An alcoholic solution containing 30% of an orange-red resin is obtained.

Analysis shows that the quantity of dye combined with the polymer by amidification is 80% of that theoretically possible.

This solution may be used directly to prepare hair lacquers or setting lotions.

EXAMPLE 19

Preparation of a mixed semi-ester semi-amide colored copolymer by condensing on a methylvinyl ether/maleic anhydride copolymer n-butyl alcohol and a dye having the formula:

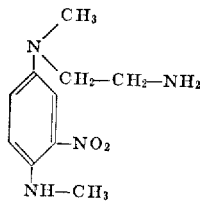

350 ml. of dioxane, 30 g. (0.2 mol) of methylvinyl ether/maleic anhydride copolymer, 13.3 g. (0.18 mol) of n-butanol and 4.48 g. (0.02 mol) of a dye having the above formula are placed in a flask equipped with agitating means, a thermometer and a condenser.

It is heated to reflux for 9 hours. The esterification is completed by the addition of 15 g. (0.2 mol) of n-butanol and it is again heated to reflux for 8 hours.

After reaction, the colored copolymer is precipitated with petroleum ether. After drying, a yield of 89% by weight of a violet powder is obtained. This powder is soluble in alcohol and in a neutralized water-alcohol mixture.

Analysis shows that the quantity of dye bonded to the copolymer by amidification is 84.5% of that theoretically possible.

EXAMPLE 20

Preparation of a mixed semi-ester semi-amide colored copolymer by condensing on a methyl methacrylate/maleic anhydride copolymer n-butyl alcohol and a dye having the formula:

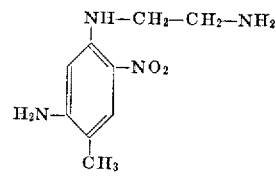

150 cc. of dioxane, 34 g. (0.1 mol) of methyl methacrylate/maleic anhydride copolymer having an anhydride index of 331 (which corresponds to a copolymer containing 29% maleic anhydride and 71% methyl methacrylate), 6.66 g. (0.09 mol) of n-butanol and 2.1 g. (0.01 mol) of the above dye are placed in a flask equipped with agitating means, a thermometer and a condenser.

The mixture is heated to reflux for 16 hours; then the esterification is completed by adding 7.4 (0.1 mol) of n-butanol and it is again heated to reflux for 8 hours.

After condensation, the colored copolymer is precipitated with petroleum ether. After drying, a yellow powder is obtained. The yield is 85% by weight, and this powder is soluble in alcohol and in a water-alcohol mixture in its neutralized form.

Analysis shows that the quantity of dye combined with the polymer by amidification is 83% of that theoretically possible.

The colored resins obtained according to the above cited examples may be separated from the solution, which also contains dye which has not participated in the amidification reaction, by adding to the reaction solution enough ether, for example, to cause the precipitation of the colored resin which may then be washed and dried.

In practice it may not be necessary to proceed to such a purification by precipitation of the colored resin and the reaction mixture may for example, be used as is to prepare lacquers or setting lotions, particularly in the case in which most of the dye has been fixed by amidification and the dye remaining in solution does not pose any difficulty for the contemplated application.

In the above-cited examples, the initial resin used is a commercial resin which is sold in the esterified state, so that it is not necessary to esterify it. It goes without saying that the same results may be obtained by starting with an unesterified resin which is esterified in a conventional manner with an alcohol.

EXAMPLE C

To prepare a setting lotion according to the invention, the following solution is prepared:

Copolymer obtained as in Example 10: 2 g.
Triisopropanolamine, q.s.p.: pH=7
Ethyl alcohol: 50 ml.
Water, q.s.p.: 100 ml.

This lotion is applied to natural brown hair after shampooing, that is to dampened and dried hair. The hair is then set in the customary manner.

When dry, the hair is shiny and easily arranged. A violine mahogany shade results.

EXAMPLE 21

Preparation of a mixed semi-ester semi-amide colored copolymer by condensing on a methylvinylether/butyl monomaleate copolymer a dye having the formula:

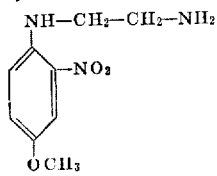

45.75 g. (0.1 mol) of an alcoholic solution containing 50.2% of the methylvinylether/butyl monomaleate copolymer known under the trademark "Gantrez AN 3953" are placed in a flask equipped with agitating means, a reflux condenser and a thermometer and diluted with 36 g. of ethanol.

2.22 g. (0.01 mol) of the above dye are added and the mixture is heated to reflux for 15 hours. An alcoholic solution containing 30% of a yellow-orange resin is obtained.

It is found by analysis that the quantity of the dye bonded to the copolymer by amidification is 96.5% of that theoretically possible.

EXAMPLE 22

Preparation of a mixed semi-ester semi-amide colored copolymer by condensing on a methylvinylether/butyl monomaleate copolymer a dye having the formula:

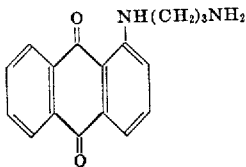

91.5 g. (0.2 mol) of an alcoholic solution containing 50.2% of the methylvinylether/butyl monomaleate copolymer known under the trademark "Gantrez AN 3953" are placed in a flask equipped with agitating means, a thermometer and a reflux condenser and diluted with 75 g. of ethanol. 5.6 g. (0.02 mol) of the above dye are added and the mixture is heated to reflux for 23 hours.

An alcoholic solution containing 30% of a red resin is obtained.

It is found by analysis that the quantity of the dye bonded to the copolymer by amidification is 95.5% of that theoretically possible.

EXAMPLE 23

Preparation of a mixed semi-ester semi-amide colored copolymer by condensing on a methylvinylether/butyl monomaleate copolymer a dye having the formula:

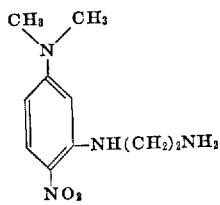

91.5 g. (0.2 mol) of an alcoholic solution containing 50.2% of methylvinylether/butyl monomaleate copolymer known under the trademark "Gantrez AN 3953" are placed in a flask equipped with agitating means, a thermometer and a reflux condenser.

4.48 g. (0.02 mol) of the dye indicated above are added and the mixture heated to reflux for 15 hours.

An alcoholic solution containing 30% of a yellow resin is obtained.

It is found by analysis that the quantity of the dye bonded to the copolymer by amidification is 96% of that theoretically possible.

EXAMPLE 24

Preparation of a mixed semi-ester semi-amide colored copolymer by condensing on a methylvinylether/butyl monomaleate copolymer a dye having the formula:

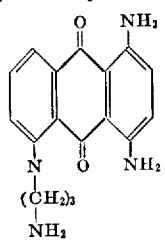

89 g. (0.2 mol) of an alcoholic solution containing 51.7% of the methylvinylether/butyl monomaleate copolymer known under the trademark "Gantrez AN 3953" are placed in a flask equipped with agitating means, a reflux condenser and a thermometer and diluted with 79 g. of ethanol.

6.2 g. (0.02 mol) of the above dye are added and the mixture is heated to reflux for 20 hours.

An alcoholic solution containing 30% of a blue resin is obtained.

It is found by analysis that the quantity of the dye fixed on the copolymer by amidification is 80% of that theoretically possible.

EXAMPLE 25

Preparation of a mixed semi-ester semi-amide colored copolymer by condensing on a methylvinylether/maleic anhydride copolymer n-butyl alcohol and a dye having the formula:

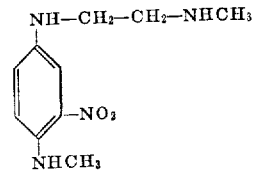

200 ml. of anhydrous dioxane, 30 g. (0.2 mol) of the methylvinyl ether/maleic anhydride copolymer known under the trademark "Gantrez AN 119," 13.3 g. (0.18 mol) of n-butanol and 4.48 g. (0.02 mol) of the above dye are placed in a flask equipped with agitating means, a thermometer and a reflux condenser. The mixture is heated to reflux for 12 hours. The esterification is completed by the addition of 14.8 g. (0.2 mol) of n-butanol and the mixture is again heated to reflux for 8 hours.

After reaction, the colored copolymer is precipitated with petroleum ether. After drying, a violet-red powder is obtained. The yield is 87% by weight.

It is found by analysis that the quantity of the dye fixed on the copolymer by amidification is 83% of that theoretically possible.

EXAMPLE 26

Preparation of a mixed semi-ester semi-amide colored copolymer by condensing on an ethylene/maleic anhydride copolymer n-butyl alcohol and a dye having the formula:

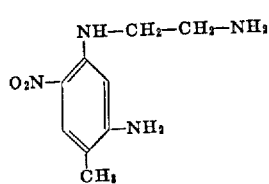

150 ml. of anhydrous dioxane, 28.6 g. (0.2 mol) of the ethylene/maleic anhydride copolymer known under the trademark "DX 840–11," 13.3 g. (0.18 mol) of n-butanol and 4.2 g. (0.02 mol) of the above dye are placed in a flask equipped with agitating means, a reflux condenser and a thermometer.

It is heated to reflux for 15 hours. The esterification is completed by the addition of 14.8 g. (0.2 mol) of n-butanol and the mixture is again heated to reflux for 8 hours.

After reaction, the colored copolymer is precipitated with ethyl ether. After drying, a yellow powder is obtained. The yield is 80% by weight.

It is found by analysis that the quantity of the dye bonded to the copolymer by amidification is 90% of that theoretically possible.

EXAMPLE 27

Preparation of a colored polymer by condensing on 1 mol of polyacrylyl chloride 0.75 mol of water and 0.25 mol of a dye having the formula:

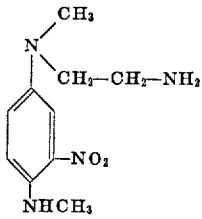

11.2 g. (0.05 mol) of the above dye dissolved in 140 ml. of pure dioxane, 20 g. (0.2 mol) of triethylamine and 2.7 g. (0.15 mol) of water are placed in a 500 ml. flask equipped with agitating means, a thermometer, an air condenser and a tube for introducing nitrogen. With the temperature held at 25° C., 18 g. (0.2 mol) of polyacrylyl chloride prepared in the usual manner, dissolved in 70 ml. of anhydrous dioxane, are added drop by drop. The mixture is stirred for 5 hours at ordinary temperatures. The resultant triethylamine hydrochloride is filtered and the colored polymer dissolved in the filtrate is precipitated with petroleum ether.

A fluid resin is obtained, which after washing with water and drying, yields 65% by weight of a violet-red powder.

It is found by analysis that the quantity of the dye bonded to the polymer by amidification is 81% of that theoretically possible.

EXAMPLE 28

Preparation of a semi-ester semi-amide colored copolymer by condensing on a 30% butyl acrylate/70% acrylyl chloride copolymer a dye having the formula:

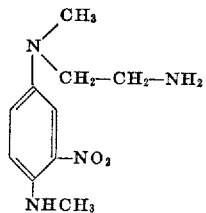

11.2 g. (0.05 mol) of the above dye, dissolved in 160 ml. of pure dioxane, 11.6 g. (0.116 mol) of triethylamine and 1.19 g. (0.066 mol) of water are placed in a 500 cc. flask equipped with agitating means, a thermometer, an air condenser and a tube for introducing nitrogen. While the temperature is held at about 20° C. a solution of 16.9 g. (0.166 mol) of a 30% butyl acrylate/70% acrylyl chloride copolymer obtained in the usual manner, dissolved in 100 ml. of anhydrous dioxane, is added drop by drop.

The mixture is stirred for 2½ hours at ordinary temperatures. The resulting triethylamine chloride is filtered and the colored copolymer dissolved in the filtrate is precipitated with ethyl ether.

A resin is obtained which, after washing with water and drying, yields 70% by weight of a violet-red powder.

It is found by analysis that the quantity of the dye bonded to the copolymer by amidification is 77% of that theoretically possible, and that the colored copolymer thus obtained is a 30% butyl acrylate/40% acrylic acid/ 30% 1-N-methylamino - 2 - nitro-4-N,N(methyl-β-acryloylaminoethyl)-amino benzene copolymer.

EXAMPLE 29

Preparation of a colored copolymer by copolymerization of an N-(1-acryloylaminopropyl) - amino - anthraquinone colored monomer with vinylpyrrolidone.

47.5 g. of vinylpyrrolidone, 2.5 g. of 1-N-(acryloylaminopropyl) - amino-anthraquinone [obtained by condensing acrylyl chloride on the dye N-(1-amino-anthraquinone)] and 0.5 g. of azobisisobutyronitrile in solution in 150 ml. of anhydrous dioxane are placed in a flask equipped with agitating means, a thermometer, a reflux condenser and a tube for introducing nitrogen. The mixture is heated to reflux. After 7 hours of heating, the polymerization is terminated. The colored copolymer in solution is precipitated with ethyl ether.

A resin is obtained which, after drying, yields 64% by weight of a red powder.

It is found by analysis that the resulting colored copolymer is a 95% vinylpyrrolidone/5% 1-N-(acryloylaminopropyl)-amino anthraquinone copolymer.

Resins of the type described in Examples 8–29 may be used in both hair lacquers and hair setting lotions:

EXAMPLE D

To prepare a colored aerosol lacquer according to the invention, the following solution is first prepared:

Copolymer obtained as in Example 21: 0.1 g.
Copolymer obtained as in Example 22: 0.05 g.
Methylvinyl ether/butyl monomaleate copolymer known under the trademark "Gantrez AN 3953": 5 g.
Triisopropanolamine q.s.p.: pH 6.2.
Absolute alcohol q.s.p.: 100 g.

35 g. of this solution are placed in an aerosol bomb with 27 g. of the fluorinated hydrocarbon known under the trademark "Freon 11" and 38 g. of the fluorinated hydrocarbon known under the trademark "Freon 12."

When this is sprayed on chestnut or blond hair, a lacquer yielding golden glints is obtained.

It does not rub off on linen and comes out easily with brushing or shampooing.

The third type of novel colored polymers according to the present invention is characterized by the fact that they may be manufactured with a degree of consistency in their physical characteristics and colors, and that they have a particularly strong coloring effect since it is possible to attach a notably higher number of molecules of dye to the structural chain of the polymer than is the case with those colored polymers known up to the present time.

Due to this fact, colored polymers of the third type contemplated by the present invention may be used very advantageously when mixed with colorless polymers chosen for their good cosmetic quality so as to impart to these colorless polymers a particular coloration. Because of the intensity of the coloring effect obtained with polymers of this third type, the addition of small quantities thereof to colorless polymers is sufficient to produce the desired coloring effect without impairing the cosmetic qualities of the latter polymers.

As hereinbefore pointed out, colored resins of this third type consist of a dyed homopolymer to the macromolecular chain of which at least one amine dye is attached by a chemical bond of the amide type.

The term "dyed homopolymer" is used in the present description to designate resins consisting of homopolymers to which dyes have been attached at certain places while other groups, for example "alcohol" groups, may be attached at other places. In other words, the expression "dyed homopolymer" thus signifies that the colored resin has been obtained from a homopolymer but not necessarily that the colored polymer taken as a chemical entity is itself a homopolymer, that is, that all its monomeric units are identical.

According to a preferred embodiment of this third type of colored polymer of this invention, the amine dye used to color the homopolymer consists of an extra-nuclear amine dye in which the nitrogen of the extra-nuclear amine function is used to form the amide bond which binds the dye to the homopolymer.

In particular, it is possible to use extra-nuclear amine dyes having the following formula:

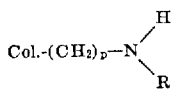

in which:

p is an integer between 2 and 6 inclusive,

R represents a hydrogen atom, a —CH₃ radical, or the —C₂H₅ radical,

The expression "Col." represents a cyclic or polycyclic dye such as for example, benzenic or anthraquinone dyes.

Among the dyes having the above formula are those which have, in addition to the amine function which is used for the bond with the polymer, at least one other amine function, substituted directly on the ring.

Among the homopolymers which may be combined with the above dyes are those organic acid anhydrides having an ethylenic bond, such as poly(maleic anhydride) homopolymer, poly(itaconic anhydride) homopolymer, poly(acrylic anhydride) homopolymer, poly(methacrylic anhydride) homopolymer, and a poly(mixed acrylic/methacrylic anhydride) although this list is by no means exhaustive.

In accordance with the invention, it is possible to form dyed homopolymer in which some of the amine functions are broken up by using dyes as described above, while the other amine functions are broken up by using alcohols such as butanol or ethanol.

For example, dye molecules in a quantity amounting to 5 to 25% of the number of anhydride functions may be condensed on the homopolymer, while the rests of the anhydride functions are broken up by one or more alcohols.

Another object of the present invention is to provide a process for preparing the dyed homopolymers which is essentially characterized by the fact that the amine dyes, and possibly the alcohols as well, are condensed on the homopolymer in a reaction medium consisting of an organic solvent such as dioxane or a ketone, at a temperature corresponding to the boiling point of the chosen solvent for a time, for example, between 2 and 24 hours and the resultant dyed homopolymer is precipitated, for example, with petroleum ether.

A further object of the present invention is also to provide a second process for preparing the above-defined dyed homopolymers, this second process being essentially characterized by the fact that at least one dye is condensed on a monomer which may be polymerized to constitute a new polymer. Then the monomers thus colored are polymerized either with themselves or with other monomers on which no dyes have been condensed.

Dyed homopolymers as defined above may be mixed with colorless polymers such as a polyvinylpyrrolidone, polyvinylpyrrolidone/vinyl acetate copolymers or other colorless polymers of known types thereby producing a colored mixture particularly suitable for cosmetic use.

Several examples of this third type of colored resin, and methods of preparing it, will now be described purely by way of illustration.

EXAMPLE 30

Preparation of a colored mixed semi-ester semi-amide polymer by condensing on poly(maleic anhydride) both n-butyl alcohol and a dye having the formula:

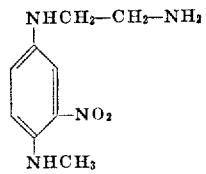

300 ml. of anhydrous dioxane, 29.4 g. (0.3 mol) of poly(maleic anhydride), 6.3 g. (0.03 mol) of a dye having the above formula and 20 g. (0.27 mol) of n-butanol are placed in a flask equipped with agitating means, a thermometer and a reflux condenser. This is heated to reflux for 10 hours. Esterification is completed by adding 22.2 g. (0.3 mol) of n-butanol and again heating to reflux for 7 hours.

The colored copolymer is then precipitated with petroleum ether. Drying yields 83% by weight of a violet powder which is soluble in alcohol and in a hydroalcoholic solution.

Analysis shows that the quantity of dye combined with the polymer by amidification is 82% of that theoretically possible.

EXAMPLE 31

Preparation of a colored mixed semi-ester semi-amide polymer by condensing on poly(itaconic anhydride) both n-butyl alcohol and a dye having the formula:

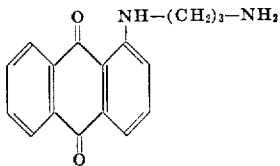

33.6 g. (0.3 mol) of poly(itaconic anhydride), 200 g. of anhydrous dioxane, 4.2 g. (0.015 mol) of dye having the above formula and 21 g. (0.285 mol) of n-butanol are placed in a flask equipped with agitating means, a thermometer and a reflux condenser. The mixture is heated to reflux for 15 hours. The esterification is completed by addition of 22.2 g. (0.3 mol) of n-butanol and it is again heated to reflux for 7 hours.

The colored copolymer is then precipitated with petroleum ether. Drying yields 79.5% by weight of a red powder, which is soluble in alcohol and in a hydroalcoholic mixture.

It is found by analysis that 100 percent of the theoretically possible quantity of dye is bonded to the polymer by amidification.

EXAMPLE 32

Preparation of a colored mixed semi-ester semi-amide polymer by condensing on poly(acrylic anhydride) both n-butyl alcohol and a dye having the formula:

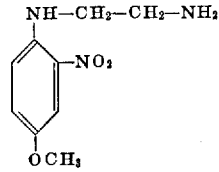

37.8 g. (0.3 mol) of poly(acrylic anhydride), 200 g. of anhydrous dioxane, 3.165 g. (0.015 mol) of dye having the above formula and 21 g. (0.285 mol) of n-butanol are placed in a flask equipped with agitating means, a thermometer and a reflux condenser.

The mixture is heated to reflux for 12 hours. Esterification is completed by the addition of 22.2 g. (0.3 mol) of n-butanol and it is again heated to reflux for 8 hours.

The colored copolymer is then precipitated with petroleum ether. After drying, an orange-yellow powder is obtained. The yield is 82% by weight. This powder is soluble in alcohol and in a hydroalcoholic mixture.

It is found by analysis that the quantity of dye bonded to the polymer by amidification is 100% of that theoretically possible.

EXAMPLE 33

Preparation of a colored mixed semi-ester semi-amide polymer by condensing on poly(methacrylic anhydride) both n-butyl alcohol and a dye having the formula:

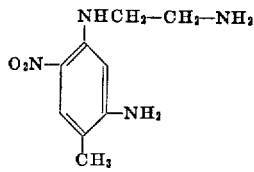

46 g. (0.3 mol) of poly(methacrylic anhydride), 200 g. of anhydrous dioxane, 3.15 g. (0.015 mol) of a dye having the above formula and 21 g. (0.285 mol) of n-butanol are placed in a flask equipped with agitating means, a thermometer and a reflux condenser.

The mixture is heated to reflux for 15 hours. Esterification is completed by adding 22.2 g. (0.3 mol) of n-butanol and it is again heated to reflux for 7 hours.

The colored copolymer is then precipitated with petroleum ether. After drying, the yield is 71.5% by weight of a yellow powder which is soluble in alcohol and in a hydroalcoholic mixture.

It is found by analysis that the quantity of dye bonded to the polymer by amidification is 100% of that theoretically possible.

EXAMPLE 34

Preparation of a colored mixed semi-ester semi-amide polymer by condensing on a poly(mixed acrylic/methacrylic anhydride) both n-butyl alcohol and a dye having the formula:

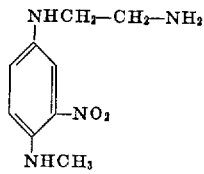

42 g. (0.3 mol of poly(mixed acrylic methacrylic anhydride), 200 g. of dioxane, 3.15 g. (0.015 mol) of a dye having the above formula and 21 g. (0.285 mol) of n-butanol are placed in a flask equipped with agitating means, a thermometer and a reflux condenser.

The mixture is heated to reflux for 15 hours. Esterification is completed by the addition of 22.2 g. (0.3 mol) of n-butanol and it is again heated to reflux for 7 hours.

The colored copolymer is then precipitated with petroleum ether. Drying yields 76% by weight of a red violet powder which is soluble in alcohol and in a hydroalcoholic solution.

It is found by analysis that the quantity of dye bonded to the polymer by amidification is 68.4% of that theoretically possible.

EXAMPLES OF APPLICATION

EXAMPLE E

To set hair with a lotion conforming to the invention, the following solution is prepared:

Polymer obtained as in Example 30: 2 g.
2-amino-2-methyl-1-propanol q.s.p.: pH 8.5
Ethyl alcohol q.s.p.: 50°
Water q.s.p.: 100 ml.

This solution is applied to brown hair which has previously been shampooed and the hair is set in the usual manner.

When the hair is dried and arranged it has a violine mahogany shade.

EXAMPLE F

To obtain a setting lotion according to the invention, the following solution is prepared:

Polymer obtained as in Example 32: 1.3 g.
Polymer obtained as in Example 31: 0.7 g.
2-amino-2-methyl-1-propanol q.s.p.: pH 8
Ethyl alcohol q.s.p.: 50°
Water q.s.p.: 100 ml.

This lotion is applied to chestnut or blond hair which has been dampened and dried and the hair is then set in the usual manner.

After drying the hair shines and has golden glints.

What is claimed is:

1. A colored water- or alcohol-soluble polymer consisting essentially of a polymer selected from the group consisting of:

(1) polymer repeating units corresponding to the formula:

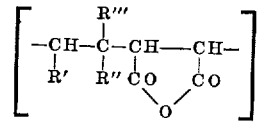

wnerein $R'$ and $R''$ each independently represent a member selected from the group consisting of hydrogen, lower alkyl, phenyl and lower alkoxy, $R'''$, represents a member selected from the group consising of hydrogen, $-OCOCH_3$, $-C\equiv N$ and $-COOCH_3$;

(2) polymer having repeating units corresponding to the formula:

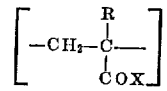

wherein R is selected from the group consisting of hydrogen and methyl, and X is halogen; and (3) polymer having repeating units corersponding to the formula:

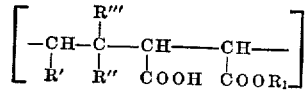

wherein $R'$ and $R''$ each independently represent a member selected from the group consisting of hydrogen, lower alkyl, phenyl and lower alkoxy, $R'''$, represents a member selected from the group consisting of hydrogen, $-OCOCH_3$ $-C\equiv N$ and $-COOCH_3$ and $R_1$ represents lower alkyl and a dye corresponding to the following formula:

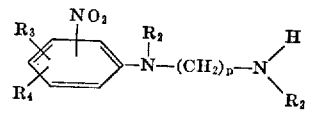

wherein $R_2$ represents a member selected from the group consisting of hydrogen, $-CH_3$ and $-C_2H_5$;
$R_3$ represents a member selected from the group consisting of hydrogen and
wherein

$R_2$ has the meaning given above and
$R_4$ represents a member selected from the group consisting of hydrogen, $-CH_3$ and $-OCH_3$, said dye being bonded to said polymer by an amide bond formed from the reactive function of said polymer, said reactive function being selected from the group consisting of the anhydride function of polymer (1), the acyl function of polymer (2) and the ester function of polymer (3) and the terminal nitrogen atom

of said dye.

2. The colored water- or alcohol-soluble polymer of claim 1 wherein the quantity of dye combined with said polymer by amidification ranges between 77–95.5% of theoretical.

References Cited

UNITED STATES PATENTS

| | | | |
|---|---|---|---|
| 2,687,431 | 8/1954 | Marschall | 260—577(X) |
| 2,750,326 | 6/1956 | Eckardt | 260—573(X) |
| 2,890,094 | 6/1959 | Tucker | 8—10(X) |
| 3,049,393 | 8/1962 | Seemuller | 260—570.5(X) |
| 3,088,978 | 5/1963 | Brunner et al. | 260—580 |
| 3,236,891 | 2/1966 | Seemuller | 260—570.5 |
| 3,251,743 | 5/1966 | Hahn et al. | 8—10(X) |
| 3,274,249 | 9/1966 | Brunner et al. | 260—573 |
| 2,723,248 | 11/1955 | Wright | 424—71(X) |
| 3,278,486 | 10/1966 | Meek et al. | 260—202(X) |
| 3,484,417 | 12/1969 | Kalopissis et al. | 260—78.5 |

FOREIGN PATENTS

| | | | |
|---|---|---|---|
| 944,439 | 12/1963 | Great Britain | 424—71 |

OTHER REFERENCES

Brunner et al., "Pulmonary Disease and Hair-Spray Polymers: A Disputed Relationship," Journal of the American Medical Association, vol. 184, No. 11, June 15, 1963.

"Gantrez AN," General Aniline and Film Corp., Technical Bulletin 7543–017, copyright 1961, 1965, 140 W. 51st St., New York, N.Y. 10020.

CHARLES B. PARKER, Primary Examiner

C. F. WARREN, Assistant Examiner

U.S. Cl. X.R.

8—10, 10.1, 10.2; 260—41C, 194, 207, 207.1, 377, 471, 488, 518, 562, 78.5; 424—70

UNITED STATES PATENT OFFICE
CERTIFICATE OF CORRECTION

Patent No. 3,597,468      Dated August 3, 1971

Inventor(s) Gregoire Kalopissis et al.

It is certified that error appears in the above-identified patent and that said Letters Patent are hereby corrected as shown below:

At Col 2, between lines 50 and 58, change the structural formula to read:

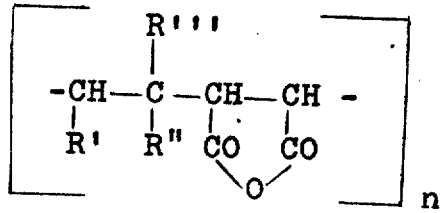

;

At Col. 22, line 20 (claim 1) after "polymer" and before "repeating" insert -- having --

Signed and sealed this 18th day of July 1972.

(SEAL)
Attest:

EDWARD M. FLETCHER, JR.
Attesting Officer

ROBERT GOTTSCHALK
Commissioner of Patents